C. MITCHELL.
Animal-Pokes.

No. 149,775. Patented April 14, 1874.

Witnesses.
Wm Howard
Wm E. Chaffee

Inventor
Calvin Mitchell
By Cox & Cox
Attys.

UNITED STATES PATENT OFFICE.

CALVIN MITCHELL, OF ST. LAWRENCE COUNTY, NEW YORK.

IMPROVEMENT IN ANIMAL-POKES.

Specification forming part of Letters Patent No. 149,775, dated April 14, 1874; application filed January 6, 1874.

*To all whom it may concern:*

Be it known that I, CALVIN MITCHELL, of the county of St. Lawrence, State of New York, have invented certain new and useful Improvements in Animal-Pokes, of which the following is a specification, reference being had to the accompanying drawings.

The invention relates to an animal-poke; and consists of two plates, in outline conformed generally to the front of the animal's breast, and hinged on their upper edges and secured by a strap at their lower to resist the pressure of helical springs placed between the boards. One plate is provided with spikes projecting toward the other plate, and on its lower edge with a pair of arms depending downward and forward. The other plate is provided with apertures, through which the spikes aforesaid are forced when the plate whereon they are placed is forced toward the other plate by pressure upon the arms.

The device is suspended by a flexible loop about the neck of an animal, with the perforated plate against its breast, and is intended to provide an efficient means of preventing animals from jumping and destroying fences.

Figure 1:
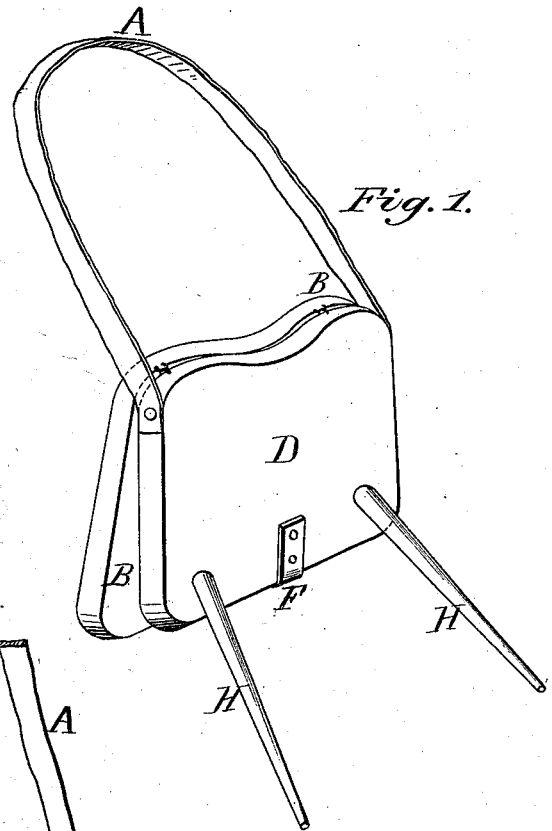
Figure 2:
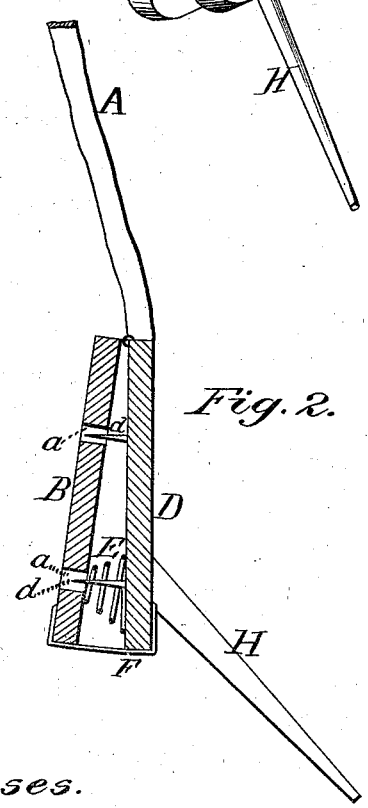

Figure 1 is a perspective view of a device embodying the elements of the invention. Fig. 2 is a vertical central sectional view of same.

A, in the accompanying drawings, is a loop or strap, which suspends the device about the animal's neck, so that the plate B, provided with the perforations *a*, lies in contact with the animal's chest. The plates B and D are of similar dimensions, are hinged on their upper edges, and have the springs E placed between them, their lower edges being restrained from expanding too greatly by the strap F, as shown, the outline of the plates being somewhat like that of the front of the animal's breast. The plate D is provided on its inner surface with the spikes *d* placed opposite and projecting partly through the apertures *a*. On the lower edge of the plate D are provided the arms H, which project downward and forward a proper distance. Thus, when the animal approaches a fence or other object, the ends of the arms H coming in contact with the same forces the plate B back, driving the spikes *d* through the apertures *a* and against the animal's chest. The springs E keep the plates expanded, so that the spikes do not touch the animal unless the arms H are pressed against some object.

I claim--

The plates B and D, in outline conforming to animal's breast, hinged at their upper edges, provided with the spikes *d* and springs E, and suspended upon the neck of an animal by the flexible loop A, substantially as shown, and for the uses described.

In testimony that I claim the foregoing improvements in animal-pokes, as above described, I have hereunto set my hand and seal this 18th day of December, 1873.

CALVIN MITCHELL. [L. S.]

Witnesses:
 EDWARD BARRY,
 GEO. W. POOLE.